United States Patent
Tomura et al.

(10) Patent No.: US 8,577,575 B2
(45) Date of Patent: Nov. 5, 2013

(54) CONTROL APPARATUS FOR VEHICLE

(75) Inventors: Masayuki Tomura, Obu (JP); Kenji Kawahara, Kariya (JP)

(73) Assignee: Denso Corporation, Kariya (JP)

( * ) Notice: Subject to any disclaimer, the term of this patent is extended or adjusted under 35 U.S.C. 154(b) by 162 days.

(21) Appl. No.: 13/323,137

(22) Filed: Dec. 12, 2011

(65) Prior Publication Data

US 2012/0150406 A1    Jun. 14, 2012

(30) Foreign Application Priority Data

Dec. 10, 2010    (JP) .................. 2010-276077

(51) Int. Cl.
    *G06F 7/70*    (2006.01)
(52) U.S. Cl.
    USPC .............. 701/70; 701/113; 180/337
(58) Field of Classification Search
    USPC ............ 701/55, 70, 102, 112, 113; 180/337
    See application file for complete search history.

(56) References Cited

U.S. PATENT DOCUMENTS

| | | | | |
|---|---|---|---|---|
| 4,949,078 A * | 8/1990 | Ito et al. | ......................... | 340/635 |
| 5,451,820 A * | 9/1995 | Gotoh et al. | .................. | 307/10.6 |
| 2002/0066435 A1* | 6/2002 | Okamoto | ..................... | 123/396 |
| 2003/0041830 A1* | 3/2003 | Sugiura et al. | ............. | 123/179.4 |
| 2003/0173124 A1* | 9/2003 | Okada et al. | ................... | 180/65.2 |
| 2003/0183194 A1* | 10/2003 | Noguchi | ........................ | 123/396 |
| 2007/0114844 A1* | 5/2007 | Maki et al. | ............... | 303/122.09 |
| 2008/0103683 A1* | 5/2008 | Tabata et al. | ................... | 701/112 |
| 2010/0228460 A1* | 9/2010 | Saito | ............................... | 701/70 |
| 2010/0250075 A1* | 9/2010 | Suzuki et al. | .................. | 701/55 |
| 2011/0253099 A1* | 10/2011 | Han et al. | ...................... | 123/350 |

FOREIGN PATENT DOCUMENTS

| | | |
|---|---|---|
| EP | 1 647 707 A1 | 4/2006 |
| JP | A-2001-304025 | 10/2001 |
| JP | B2-4376749 | 12/2009 |

* cited by examiner

*Primary Examiner* — Thomas Black
*Assistant Examiner* — Shardul Patel
(74) *Attorney, Agent, or Firm* — Oliff & Berridge, PLC

(57) ABSTRACT

A control apparatus for a vehicle, where the vehicle includes control means for stopping an engine automatically when a stopping condition is met, and restarting the engine after the automatic stoppage of the engine, when a predetermined restarting condition is met, a braking device that is actuated to apply braking force to a drive wheel, and a plurality of vehicle-mounted devices involved in operations of the vehicle. The apparatus includes abnormality detection means for determining whether or not there exists an abnormality in at least one of the vehicle-mounted devices, and fail-safe means for, when during the automatic stoppage of the engine it is determined by the abnormality detection means that there exists an abnormality in at least one of the vehicle-mounted devices, restarting the engine forcibly. The apparatus enables the user to take suitable measures in the presence of an abnormality in the vehicle-mounted devices.

27 Claims, 6 Drawing Sheets

CONTROL APPARATUS FOR VEHICLE

CROSS-REFERENCE TO RELATED APPLICATION

This application is based on and claims the benefit of priority from earlier Japanese Patent Application No. 2010-276077 filed Dec. 10, 2010, the description of which is incorporated herein by reference.

BACKGROUND

1. Technical Field

This invention relates to a control apparatus for a vehicle, where the vehicle is provided with control means for stopping an engine automatically when a predefined stopping condition, which includes a condition that a traveling speed of the vehicle is equal to or smaller than a prescribed speed larger than 0, is met, and restarting the engine after the automatic stoppage of the engine, when a predefined restarting condition is met, a braking device that is activated to apply braking force to a drive wheel, and a plurality of vehicle-mounted devices involved in operations of the vehicle.

2. Related Art

Known vehicles, as disclosed in Japanese Patent No. 4376749, perform idle stop control in which an engine is stopped automatically when a predefined stopping condition is met, and then the engine is restarted when a predefined restarting condition is met. The idle stop control is intended to enhance fuel efficiency.

Some of them support idle stop control such that the automatic stopping of the engine is allowed even in a running state of the vehicle (hereinafter referred to as idle-stop control in deceleration), which is intended to further enhance fuel efficiency.

Actually, when the engine is stopped automatically by the idle-stop control in deceleration, there may occur an abnormality in a vehicle-mounted device involved in operations of the vehicle. In the presence of such an abnormality, various inconveniences will occur depending on whether or not the vehicle is running, which may prevent the user from taking suitable measures such as an evasive running of the vehicle. More specifically, when the engine is stopped automatically in running, an abnormality in the vehicle-mounted device may disable the engine restart, which may prevent the user from taking suitable measures.

In consideration of the foregoing, exemplary embodiments of the present invention are directed to providing a control apparatus for a vehicle which supports the idle-stop control in deceleration, enabling a user to take suitable measures even when an abnormality occurs in a vehicle-mounted device involved in operations of the vehicle.

SUMMARY

In accordance with an exemplary aspect of the present invention, there is provided a control apparatus for a vehicle, where the vehicle includes control means for stopping an engine automatically when a stopping condition is met, which includes a condition that a traveling speed of the vehicle is equal to or smaller than a first prescribed speed larger than zero, and restarting the engine after the automatic stoppage of the engine, when a predetermined restarting condition is met, a braking device that is actuated to apply braking force to a wheel, and a plurality of vehicle-mounted devices involved in operations of the vehicle. The apparatus includes: abnormality detection means for determining whether or not there exists an abnormality in at least one of the vehicle-mounted devices; and fail-safe means for, when during automatic stoppage of the engine it is determined by the abnormality detection means that there exists an abnormality in at least one of the vehicle-mounted devices, restarting the engine forcibly and/or assisting the braking device in applying the braking force to the wheel.

In the above apparatus, at least one of the forcible restarting of the engine and the assisting of the brake device in applying the braking force is implemented. Therefore, in the presence of an abnormality in the vehicle-mounted devices during automatic stoppage of the engine, the apparatus allows the user to take suitable measures, such as restarting of the engine to ensure the driving force of the vehicle and proper application of the braking force to the wheel, according to various situations of the vehicle.

DESCRIPTION OF SPECIFIC EMBODIMENTS

The present invention will be described more fully hereinafter with reference to the accompanying drawings. Like numbers refer to like elements throughout.

Figure 1:
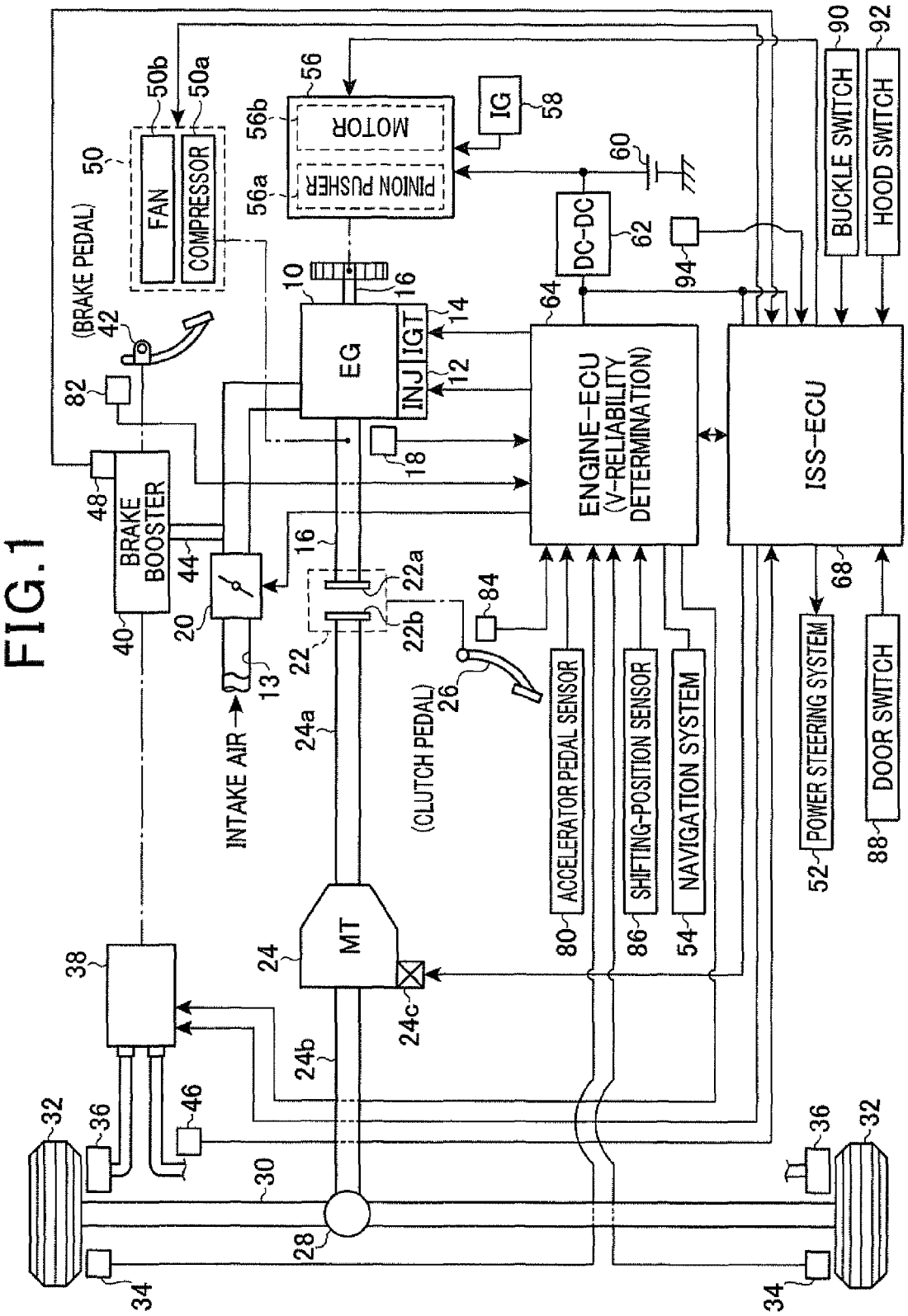
FIG. 1 schematically shows a collection of an engine system, a brake system, and an air-conditioning system, to which a control apparatus for a vehicle can be applied, in accordance with one embodiment of the present invention.

FIG. 1 shows a collection of an engine system, a brake system, and an air-conditioning system, to which a control apparatus for a vehicle equipped with a manual transmission (MT) can be applied, in accordance with one embodiment of the present invention.

Referring to FIG. 1, the engine 10 is a spark-ignition engine. Each cylinder of the engine 10 is provided with electromagnetically-driven fuel injection valve 12 that supplies fuel to a combustion chamber of the engine 10 and a spark plug 14 that generates a discharge spark to ignite an air-fuel mixture of intake air supplied via an intake manifold 13 of the engine 10 and fuel supplied via the fuel injection valve 12. Energy generated through the combustion of fuel is used as a torque for rotating an output shaft (crankshaft 16) of the engine 10. There is provided in proximity to the crankshaft 16 a crank angle sensor 18 that detects a rotation angle of the crankshaft 16. The intake manifold 13 is provided with an intake-air throttle valve (throttle valve 20) whose opening degree is adjusted by an actuator such as a DC motor or the like.

The torque of the crankshaft 16 is transferred (or transmitted) to the manual transmission (MT) 24 via a clutch device 22. The clutch device 22 is comprised of a disk 22a (flywheel or the like) coupled to crankshaft 16 and a disk 22b (clutch disc or the like) coupled to an input axis 24a of the MT 24. These disks 22a, 22b are engaged with or disengaged from each other according to a depression amount of the clutch pedal 26 by the user. In the present embodiment, it is assumed that a depression amount (clutch actuation amount) of the clutch pedal 26 when fully depressed is set to 100%, and a depression amount of the clutch pedal 26 by the user when released is set to 0%. When the clutch actuation amount becomes larger than a predetermined amount (e.g., 50% corresponding to a biting point), the disks 22a, 22b are disengaged from each other (clutch-disengaged state), and then the torque transfer (transmission) from the crankshaft 16 to the MT 24 is interrupted. On the other hand, when the clutch actuation amount becomes equal to or smaller than the predetermined amount, the disks 22a, 22b are engaged with each other (clutch-engaged state), and then the torque (of the crankshaft 16) is transferred from the crankshaft 16 to the MT 24.

The MT 24 is a multiple speed manual transmission having a plurality of forward gears (5 speeds) and a neutral gear (N), where its transmission gear ratio is changed by manipulating a shifting position of a gear-shifting device (not shown). In the MT 24, a rotation speed of the input axis 24a is changed to a rotation speed corresponding to a selected transmission gear ratio. The shifting position of the MT 24 is switched between 5 speeds (in a driving state), which allows the torque of the crankshaft 16 to be transferred to the drive wheel 32 via an output shaft 24b of the MT 24, a differential gear 28, a drive shaft 30 and others. When the shifting position is in neutral (in a non-driving state), the torque of the crankshaft 16 is inhibited from being transferred to the drive wheel 32. The MT 24 includes an actuator (gear-shifting actuator 24c) for forcibly changing the transmission gear ratio. A wheel speed sensor 34 that detects a traveling speed of the vehicles is provided in the vicinity of each of wheels including the drive wheel 32.

The brake system includes braking devices 36, each of which applies braking force to a corresponding wheel, a motorized brake actuator 38 and a brake booster 40 and others. More specifically, the braking device 36 is provided in the vicinity of each of wheels including the drive wheel 32, where the braking force which the braking device 36 applies to the wheel is increased as a depression amount (brake actuation amount) of the brake pedal 42 is increased by the user or a hydraulic pressure (brake hydraulic pressure) of a brake hydraulic system is increased by actuation of the brake actuator 38. In the present embodiment, the braking device 36 is such that the brake hydraulic pressure is raised and maintained by energization of the brake actuator 38, and is lowered through de-energization of the brake actuator 38. Further in the present embodiment, the brake actuator 38 includes a control unit (brake ECU) that receives an output signal of the wheel speed sensor 34 and performs braking control.

The brake booster 40 assists in depressing the brake pedal 42 by the user. More specifically, the brake booster 40 includes an variable pressure chamber (atmospheric chamber) in which atmospheric air is introduced as a function of a depression amount of the brake pedal 42, and a constant pressure chamber connected to an intake manifold 13 downstream of throttle valve 20 via a negative pressure supply passage 44. With this configuration, when the brake pedal 42 is not depressed, the constant pressure chamber and the variable pressure chamber are in communication with each other, and a negative pressure is introduced to the constant pressure chamber downstream of the throttle valve 20, and a pressure in the constant pressure chamber and a pressure in the variable pressure chamber are equally balanced. On the other hand, when the brake pedal 42 is depressed, the constant pressure chamber and the variable pressure chamber are separated from each other, and the atmospheric pressure is introduced into the variable pressure chamber, which leads to a pressure difference between the constant pressure chamber and the variable pressure chamber. A force created by the pressure difference assists in depressing the brake pedal 42 with predetermined brake leverage. The negative pressure refers to a pressure deviation from the atmospheric pressure, where a large negative pressure means a large pressure deviation from the atmospheric pressure, which means a low absolute pressure.

The brake hydraulic system includes a hydraulic pressure sensor 46 that detects a brake hydraulic pressure (e.g., a master-cylinder pressure). The brake booster 40 includes a vacuum sensor (or negative pressure sensor) 48 that detects a pressure in the constant pressure chamber (hereinafter referred to as a negative pressure of the brake booster 40).

The air-conditioning system 50 includes an engine-driven compressor 50a that suctions and discharges a refrigerant to circulate the refrigerant in a refrigeration cycle, and a fan 50b that blows air into a passenger compartment. More specifically, the air-conditioning system 50 further includes a defroster function that demists a car windscreen (or car window) while the compressor 50a is being driven.

The vehicle is provided with a power steering system 52, a navigation system 54 and a starter 56 and others. More specifically, the power steering system 52 includes a motorized actuator that assists in user's steering power.

The starter 56 includes an electromagnetically-driven actuator (pinion pusher 56a) for pushing a pinion (not shown), and a motor 56b that rotationally drives the pinion and others. The starter 56, which is turned on by the user turning an ignition key 58 or the like and thereby turning on a starter switch, is powered by a battery 60 (with a terminal voltage of 12V) and applies an initial torque to the crankshaft 16 (cranking). A drive circuit of the starter 56 will be described later.

The battery 60 is connected to an input terminal of a DC/DC converter 62, which is in turn connected to a plurality of ECUs via the output side of the DC/DC converter 62. The DC/DC converter 62 prevents the ECUs from being adversely affected by decrease in terminal voltage of the battery 60, and boosts the terminal voltage of the battery 60 to a specified voltage (nominal terminal voltage of the battery 60) as an output voltage. In the present embodiment, the plurality of ECUs include an ECU for the engine system (engine-ECU 64), an ECU (ISS-ECU 68) for the air-conditioning system and vehicle-mounted devices (starter 56 etc.) responsible for the idle stop control (which will be described later).

There will now be explained a drive circuit of the starter 56 in accordance with the present embodiment with reference to FIG. 2.

Figure 2:
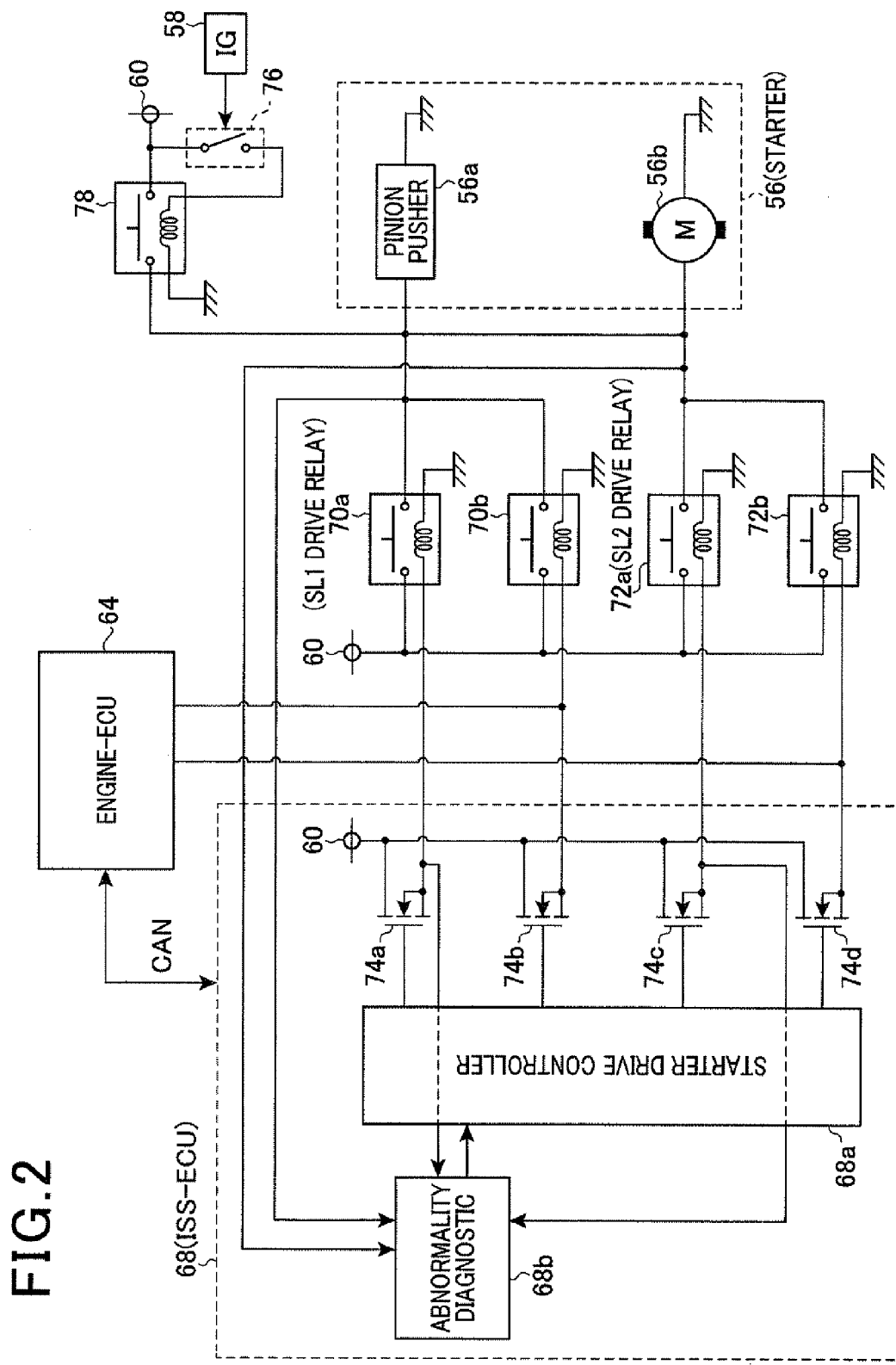
FIG. 2 schematically shows a drive circuit of a starter.

As shown in FIG. 2, a SL1 drive relay 70a that switches between energization and de-energization of the pinion pusher 56a is electrically connected between the battery 60 and the pinion pusher 56a.

A SL2 drive relay 72a, which switches between energization and de-energization of a motor 56b, and an inrush current reduction (ICR) relay (not shown) are electrically connected in series between the battery 60 and the motor 56b. The ICR relay includes a resistor and a relay connected in parallel with each other, and is operative to supply adequate power from the battery 60 to the motor 56b while suppressing an inrush current following through the motor 56b when the starter 56 is started.

The SL1 drive relay 70a is electrically connected in parallel with a backup relay (hereinafter referred to as SL1 backup relay 70b), and the SL2 drive relay 72a is electrically connected in parallel with a backup relay (hereinafter referred to as SL2 backup relay 72b). The SL1 backup relay 70b is an alternative to the SL1 drive relay 70a in the presence of an abnormality (e.g., OFF-failure) in the SL1 drive relay 70a. The SL2 backup relay 70b is an alternative to the SL2 drive relay 72a in the presence of an abnormality (e.g., OFF-failure) in the SL2 drive relay 72a.

The SL1 drive relay 70a, the SL2 drive relay 72a, the SL1 backup relay 70b and the SL2 backup relay 72b can be individually turned on and off by a starter drive controller 68a of the ISS-ECU 68. More specifically, these relays can be energized or de-energized by respective switching elements 74a-74d. In addition, the switching elements 74a-74d are each comprised of an N-channel MOSFET, where drain contacts of the switching elements 74a-74d are each electrically connected to the battery 60, source contacts of the switching elements 74a-74d are electrically connected to coils of the SL1 drive relay 70a, the SL2 drive relay 72a, the SL1 backup relay 70b and the SL2 backup relay 72b, respectively. Gate contacts of the switching elements 74a-74d receive an ON/OFF-signal output of the starter drive controller 68a.

In the present embodiment, the SL1 backup relay 70b and the SL2 backup relay 72b can be individually turned on and off by another ECU different from the ISS-ECU 68. Further in the present embodiment, the other ECU is considered to be the engine-ECU 64.

The pinion pusher 56a and the motor 56b can also be supplied with electrical power from the battery 60 by user's turning of the ignition key 58. More specifically, when the starter switch 76 is turned on by the user turning the ignition key 58, the initial drive relay 78 is turned on. Accordingly, the pinion pusher 56a and the motor 56b will be supplied with electrical power from the battery 60 through an electrical path that is different from an electrical path from the battery 60 through each of the SL1 drive relay 70a, SL2 drive relay 72a, SL1 backup relay 70b and the SL2 backup relay 72b.

With this configuration, the pinion pusher 56a is energized by turn-on of the SL1 drive relay 70a, SL1 backup relay 70b, or the initial drive relay 78, and the motor 56b is energized by turn-on of the SL2 drive relay 72a, the SL2 backup relay 72b, or the initial drive relay 78, which leads to cranking of the engine.

The ISS-ECU 68 includes an abnormality diagnostic 68b. The abnormality diagnostic 68b determines whether or not there exists an abnormality in the drive circuit of the starter 56 and an electrical path between the ISS-ECU 68 and the starter 56 and others. In the present embodiment, whether or not there exists an abnormality in various drive relays and switching elements is determined by detecting an energized state of each of an electrical path between the normally used switching element 74a and SL1 drive relay 70a, an electrical path between the normally used switching element 74c and SL2 drive relay 72a, an electrical path between the battery 60 and the pinion pusher 56a, and an electrical path between the battery 60 and the motor 56b. In addition, the ISS-ECU 68 communicates a diagnostic outcome to the engine-ECU 64 via controller area network (CAN) communication.

Referring to FIG. 1 again, the engine-ECU 64 is comprised of a microcomputer including well known CPU, ROM, RAM and others. The engine-ECU 64 receives output signals of an accelerator-pedal sensor 80 that detects an accelerator actuation amount (a depression amount of an accelerator-pedal), a brake-pedal sensor 82 that detects a brake actuation amount (a depression amount of an brake-pedal), a clutch-pedal sensor 84 that detects a clutch actuation amount (a depression amount of an clutch-pedal), a shifting position sensor 86 that detects a shifting position of the gear-shifting device, a crank angle sensor 18, and a wheel speed sensor 34 and others. The engine-ECU 64 executes various control programs stored in the ROM or the like to perform, on the basis of the output signals of the sensors, combustion control of the engine 10 through the fuel injection valve 12 and the spark plug 14, and the throttle valve 20 and others.

To enhance reliability of the vehicle control that uses a detection value of the wheel speed sensor 34, the engine-ECU 64 determines whether or not reliability of the detection value of the wheel speed sensor 34 is high. For example, the reliability of the detection value of each wheel speed sensor 34 may be considered high when it is determined that there is not any excessive difference between the detection values of wheel speed sensors 34 of the respective wheels 32 while the vehicle is traveling in a straight line, which is based on the fact that the detection values while the vehicle is traveling in a straight line are substantially equal to each other. In present embodiment, the detection value of each wheel speed sensor 34 determined to be of high reliability is used in various calculation processes.

The ISS-ECU 68 is comprised of a microcomputer including well known CPU, ROM, RAM and others. The ISS-ECU 68 receives output signals of a door switch 88 that detects an opened state of a door, a buckle switch 90 that detects attachment/detachment of a user's seat belt, a hood switch 92 that detects an opened state of a hood, a battery sensor 94 that detects a terminal voltage and output and input currents of the battery 60, a hydraulic pressure sensor 46, and a vacuum sensor 48 and others. The ISS-ECU 68 executes various control programs stored in the ROM or the like to perform, on the basis of the output signals of the sensors, air-conditioning control to be performed by the air-conditioning system 50, control of the power steering system 52, brake control instruction to the brake actuator 38, drive control of the starter 56, and idle stop control and other control.

In the idle stop control, the ISS-ECU 68 instructs the engine-ECU 64 to stop fuel injection from the fuel injection valve 12 when a predefined stopping condition is met while the engine 10 is running (automatic stopping of the engine), and then when a predefined restarting condition is met, performs drive control of the starter 56 and instructs the engine-ECU 64 to start the fuel injection from the fuel injection valve 12 (restarting of the engine).

In the present embodiment, both the engine-ECU 64 and the ISS-ECU 68 perform reset operation. In the reset operation, when it is determined that a battery voltage on the basis of an output value of the battery sensor 94 is equal to or smaller than a performance guaranteeing voltage (e.g., 6V), data stored in the RAM is cleared and/or the microcomputer is reset. Such reset operation is performed for avoiding a situation such that various controls of the vehicle are unable to be properly performed.

Actually, the air-conditioning system 50 and the power steering system 52 and others are controlled by respective ECUs. In the present embodiment, however, those ECUs are collectively denoted by the ISS-ECU 68. The engine-ECU 64 and the ISS-ECU 68 communicate information bi-directionally with each other. The information communicated therebetween includes an output signal of each sensor to be inputted to each ECU, and a signal that is used by the ECUs to check for an abnormality in each other's ECU.

Figure 3:
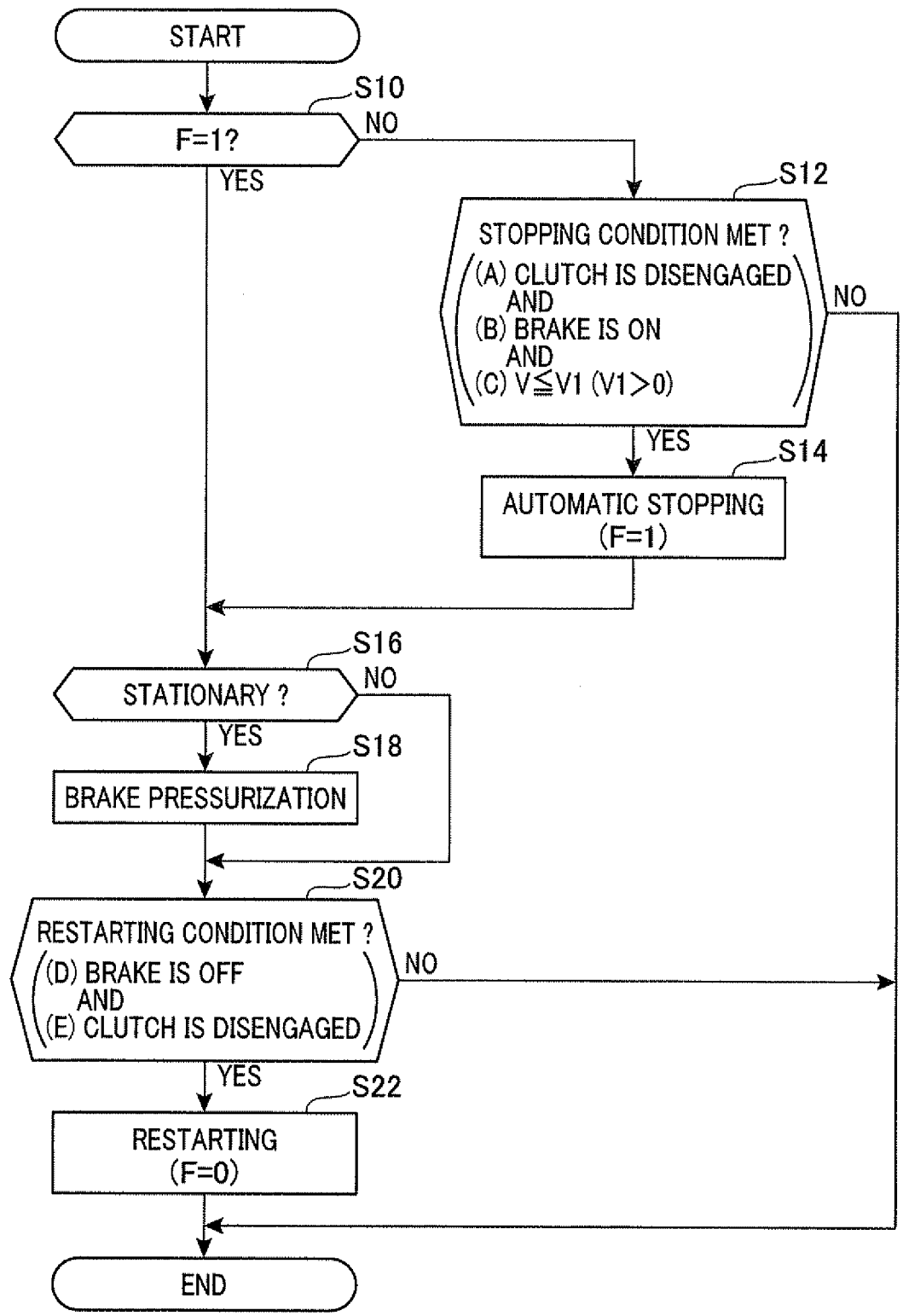
FIG. 3 shows schematically shows a flowchart of idle stop control to be performed by an idle stop & start electrical control unit (ISS-ECU)

There will now be explained with reference to FIG. 3 the idle stop control to be performed by the ISS-ECU 68 in accordance with the present embodiment. The process is repeated at a predetermined time interval.

First, in step S10, it is determined whether a value of an automatic stop flag F is 1 or 0, where the value of 0 indicates that the automatic stopping of the engine 10 has not been performed and the value of 1 indicates that the automatic stopping of the engine 10 has been performed.

If it is determined in step S10 that the value of the automatic stop flag F is 0, then the process proceeds to step S12, where it is determined whether or not a predetermined stopping condition for the engine 10 is met. In the present embodiment, the stopping condition for the engine 10 is that the logical AND of the following three conditions (A)-(C) is TRUE: (A) the clutch is disengaged, (B) the brake is being actuated (the brake is ON), and (C) the traveling speed of the vehicle is equal to or smaller than a first prescribed speed V1 (e.g., 20 km/h). The condition (C) is included to further enhance the fuel efficiency by the idle stop control.

In the present embodiment, since the engine 10 is stopped automatically before the vehicle is stopped, the idle stop control (hereinafter referred to as IS (Idle-stop) control in deceleration) can lengthen the automatic stop time period of the engine 10, which leads to enhancement of the fuel efficiency of the engine 10. Whether or not the brake is being actuated (the brake is in an ON state) may be determined, for example, on the basis of whether or not a brake actuation amount is larger than 0. The brake actuation amount can be determined on the basis of the output value of the brake-pedal sensor 82. The traveling speed of the vehicle may be calculated on the basis of the output value of the wheel speed sensor 34.

If it is determined in step S12 that the stopping condition is met, then the process proceeds to step S14, where the automatic stopping of the engine 10 is performed and the automatic stop flag F is set to 1.

If it is determined in step S10 that the value of the automatic stop flag F is 1, then the process proceeds to step S16, where it is determined whether or not the vehicle is stopped. Step S16 is performed for determining whether or not to instruct the brake ECU to perform brake pressurization. The brake pressurization is performed after the engine 10 is stopped automatically by the Idle-stop control in deceleration to actuate the brake actuator 38 by controlling power supply thereto so as to forcibly apply the braking force to the wheel in a period of time from the time when it is determined that the vehicle is stopped to the time when it is determined that the engine 10 has been restarted, thereby avoiding unintended moving backward or forward of the vehicle when the vehicle is located on an incline. More specifically, in the brake pressurization, the brake actuator 38 is actuated by controlling power supply thereto so as to keep the brake hydraulic pressure on the basis of the hydraulic pressure sensor 46 at or above a specified pressure. Whether or not the vehicle is stopped may be determined on the basis of whether or not the traveling speed of the vehicle is 0, which is determined on the basis of the output value of the wheel speed sensor 34.

If it is determined in step 16 that the vehicle is stopped (the traveling speed is 0), then the process proceeds to step S18, where the brake pressurization is performed.

On the other hand, if it is determined in step 16 that the vehicle is not stopped (the traveling speed is not 0) or after step S18, the process proceeds to step S20, where it is determined whether or not a predetermined restarting condition of the engine 10 is met. In the present embodiment, the restarting condition of the engine 10 is that the logical AND of the following two conditions (D)-(E) is TRUE: (D) the brake is not being actuated (the brake is OFF), and (E) the clutch is disengaged.

If it is determined in step S20 that the restarting condition is met, then the process proceeds to step S22, where the engine 10 is restarted, and the automatic stop flag F is set to 0.

If it is determined in step S12 that the stopping condition is not met, or if it is determined in step S20 that the restarting condition is not met, or after step S22, the process is ended in the current cycle.

Various abnormalities may occur in various actuators, such as the fuel injection valve 12 for combustion control of the engine 10, the drive circuit of the starter 56, the air-conditioning system 50, and the vehicle-mounted devices such as the ISS-ECU 68. In the presence of the abnormality, the following inconveniences may occur.

For example, it impossible to ensure driving force for the vehicle when the engine 10 is unable to be restarted due to an abnormality in the drive circuit of the starter 56, which may cause a fear that, after occurrence of the abnormality, an evasive running will not be performed properly. Further, since the negative pressure produced downstream of the throttle valve 20 becomes smaller when the engine 10 is unable to be restarted, the brake booster 40 is unable to assist in user's brake pedal 42 actuation properly, which may cause a fear that the braking force will not be applied to the wheel properly. Still further, since the compressor 50*a* is unable to be driven when the engine 10 is unable to be restarted, the defrosting function of the air-conditioning system 50 may become unavailable. When fogging of the windscreen takes place, there is a fear that visibility of the user through the windscreen will be restricted.

In particular, in the present embodiment, since the Idle-stop control in deceleration is supported, the engine 10 may be stopped while the vehicle is running, which may cause a fear that operations of the vehicle such as the brake actuation will be more adversely affected by the above inconveniences.

To avoid such inconveniences, it can be assumed that, when it is determined that there exists an abnormality in at least one of the vehicle-mounted devices, the engine 10 is restarted forcibly without exception for the purpose of ensuring the driving force for the vehicle and/or the defrosting function. However, under such an assumption, there are some cases where it may be difficult for the user to take suitable measures after occurrence of the abnormality, such as a case where the engine 10 is restarted when the user is outside the vehicle, more specifically, a case where the user opens a vehicle's hood to check the engine when the vehicle is stationary after the stop of the engine 10, and then the engine is restarted.

To overcome such inconveniences, in the present embodiment, while the engine 10 is stopped automatically, abnormality diagnosis is performed to determine in which vehicle-mounted device there exists an abnormality, and when it is determined that there exists an abnormality in at least one of the vehicle-mounted devices, running-state fail-safe operation or in a stationary state is performed. This allows the user to take suitable measures even in the presence of an abnormality in at least one of the vehicle-mounted devices.

In the following, there will now be explained abnormality diagnosis and fail-safe operation of the present embodiment with reference to FIGS. 4-6.

Figure 4:
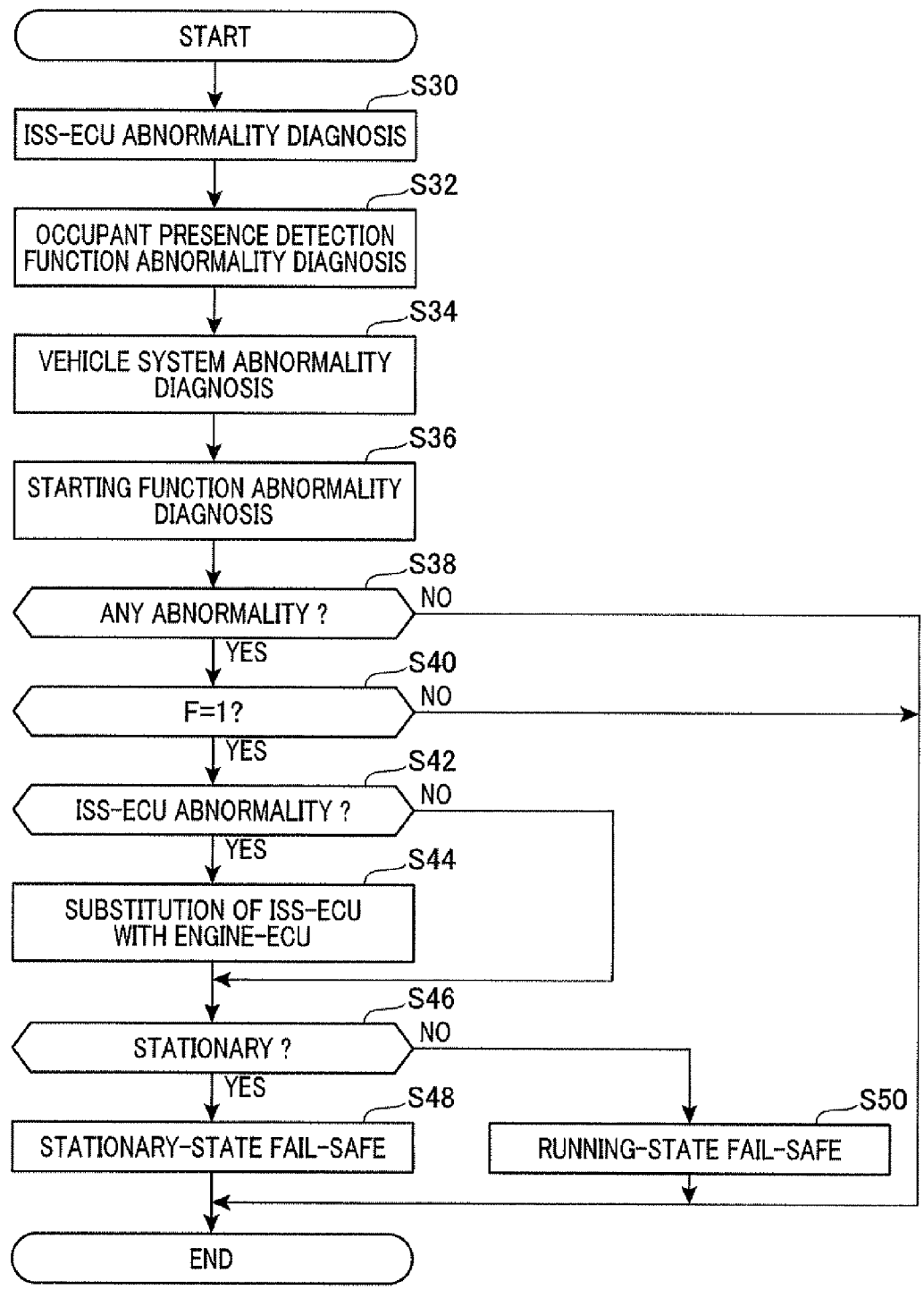
FIG. 4 schematically shows a flowchart of abnormality diagnosis to be performed normally by the ISS-ECU.

FIG. 4 shows an exemplary process for the abnormality diagnosis for the vehicle-mounted devices to be performed normally by the ISS-ECU 68 in accordance with the present embodiment. The process is repeated at a predetermined time interval.

First, in step S30, it is determined whether or not there exists an abnormality in the ISS-ECU 68. As described above, whether or not there exists an abnormality in the ISS-ECU 68 (abnormality in the ISS-ECU 68 in itself or abnormal communication) may be detected by the engine-ECU 64 that communicates bi-directionally with the ISS-ECU 68.

In step S32, it is determined whether or not there exists an abnormality in at least one of a door switch 88, a buckle switch 90 and a hood switch 92, where these switches are included in an occupant presence detection function. In abnormality diagnosis for the occupant presence detection function, for example, a voltage is applied from a constant-voltage power supply source (not shown) to the door switch 88, the buckle switch 90, and the hood switch 92 individually, and when an OFF- or ON-failure is detected on the basis of the detected energized states of the switches, it is determined that there exists an abnormality in the occupant presence detection function.

Subsequently, in step S34, it is determined whether or not there exists an abnormality in the vehicle system, where the vehicle system includes various actuators (the fuel injection valve 12, the spark plug 14, the throttle valve 20 etc.) for combustion control of the engine system, the air-conditioning system 50, and the brake system and others. The abnormality diagnosis for the vehicle system may be performed in a similar way to the abnormality diagnosis for the occupant presence detection function.

In next step S36, it is determined whether or not there exists an abnormality in a starting function, where the starting function includes elements, such as the drive relays and the switching elements, which can be diagnosed for an abnormality by the abnormality diagnostic 68b of the ISS-ECU 68.

Subsequently, in step S38, it is determined whether or not there has been detected an abnormality in at least one of the above steps S30-S36. If it is determined in step S38 that there has been detected an abnormality in at least one of the above steps S30-S36, then the process proceeds to step S40, where it is determined whether or not the automatic stopping of the engine 10 has been performed, that is, the automatic stop flag F is 1.

If it is determined in step S40 that the automatic stopping of the engine 10 has been performed, then the process proceeds to step S42, where it is determined whether or not the detected abnormality is an abnormality in the ISS-ECU 68. If it is determined in step S42 that the detected abnormality is an abnormality in the ISS-ECU 68, then the process proceeds to step S44, where the ISS-ECU 68 is substituted by the engine-ECU 64. That is, the subsequent steps will be performed in the engine-ECU 64 (substitute control unit) in place of the ISS-ECU 68 (main control unit).

If it is determined in step S42 that the detected abnormality is not an abnormality in the ISS-ECU 68, or after step S44, then the process proceeds to step S46, where it is determined whether or not the vehicle is stopped (stationary). Step S46 is performed for determining which fail-safe operation to perform in the presence of an abnormality in at least one of the vehicle-mounted devices. That is, in the presence of an abnormality in at least one of the vehicle-mounted devices, it is desirable to restart the engine 10 quickly for the purpose of ensuring the driving force for the vehicle. However, for example, when the user is not in the vehicle, it is undesirable to provide the driving force for the vehicle.

In light of the above, in the present embodiment, the running-state fail-safe operation is performed in step S50, where restarting of the engine is performed without exception on the basis of the determination in step S46 that the vehicle is not stationary (the vehicle is running). The stationary state fail-safe operation is performed in step S48 when it is determined that the vehicle is stationary (the vehicle is stopped), where restarting of the engine is performed depending on whether or not the user is riding in the vehicle. Whether or not the user is riding in the vehicle is determined not on the basis of the traveling speed of the vehicle, but on the basis of the other states of the vehicle.

If it is determined in step S38 that there has not been detected any abnormality in at least one of the above steps S30-S36, or if it is determined in step S40 that the automatic stopping of the engine 10 has not been performed, or after step S48, or after step S50, then the process is ended in the current cycle.

Figure 5:
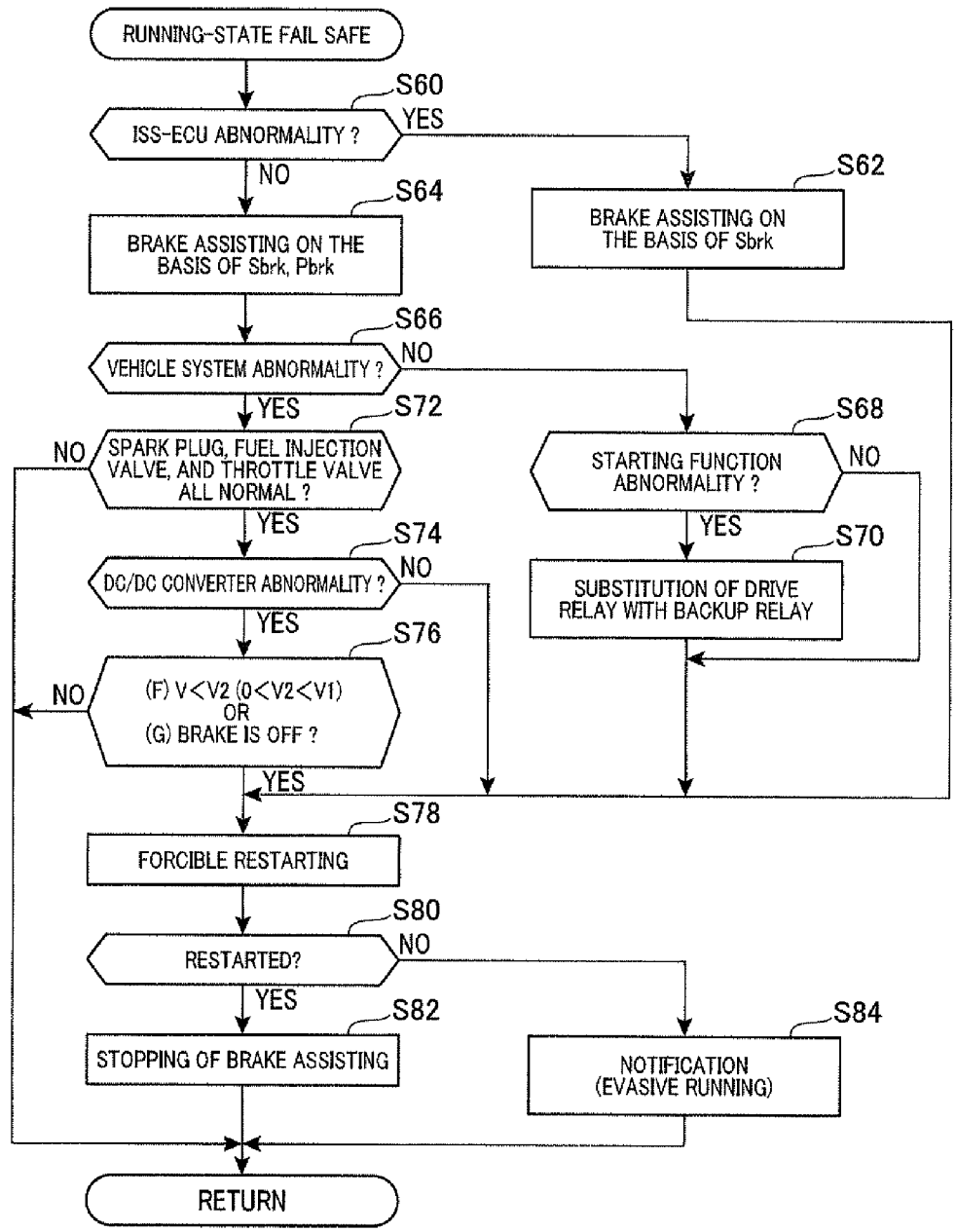
FIG. 5 schematically shows a flowchart of a running-state fail-safe operation.

FIG. 5 shows a flowchart of the running-state fail-safe operation to be performed by the ISS-ECU 68 or the engine-ECU 64.

First, in step S60, it is determined whether or not the abnormality detected in the above steps S30-S36 is an abnormality in the ISS-ECU 68. If it is determined in step S60 that the abnormality detected in the above steps S30-S36 is an abnormality in the ISS-ECU 68, then the process proceeds to step S62, where a brake assist operation is started to assist the braking device 36 in applying the braking force as a function of brake actuation amount $S_{brk}$. Step S62 is performed for ensuring the braking force until the engine 10 is restarted. That is, when the engine 10 is stopped, the brake booster 40 may become unable to assist the user in depressing the brake pedal 42 properly. Therefore, when the vehicle is running during automatic stoppage of the engine 10, the hydraulic pressure is raised as a function of a brake actuation amount $S_{brk}$ by the brake actuator 38, which allows the braking force to be applied to the wheel in response to the user's intended brake actuation.

In the brake assist operation, for example, there may be previously determined by experiment a map defining a corresponding relation between feedforward actuation amount of the brake actuator 38 for keeping an actual brake hydraulic pressure larger than the brake hydraulic pressure corresponding to the brake actuation amount $S_{brk}$ and a brake actuation amount $S_{brk}$. The brake actuator 38 is actuated by controlling power supply thereto according to the feedforward actuation amount calculated on the basis of the brake actuation amount $S_{brk}$ as an input value by using the map. Without the feedforward control, an output value of the hydraulic pressure sensor 46 may not be acquired via the ISS-ECU 68 and reliability of the output value may be decreased.

If it is determined in step S60 that the abnormality detected in the above steps S30-S36 is not an abnormality in the ISS-ECU 68, then the process proceeds to step S64, where the brake assist operation is started taking into account a negative pressure $P_{brk}$ of the brake booster 40. In the brake assist operation, for example, the brake actuator 38 may be actuated by controlling power supply thereto to perform the feedforward control for keeping the actual brake hydraulic pressure at a target brake hydraulic pressure larger than the brake hydraulic pressure corresponding to the brake actuation amount $S_{brk}$, where the target brake hydraulic pressure may be increased with a decreasing negative pressure $P_{brk}$ of the brake booster 40. As the negative pressure $P_{brk}$ of the brake booster 40b becomes smaller, the brake actuation amount $S_{brk}$ corresponding to user's predetermined depressing force becomes smaller, which may disable the user to achieve his/her desired brake actuation. The keeping of the actual brake hydraulic pressure at the target brake hydraulic pressure will compensate for a shortfall of the brake actuation amount. It should be noted that, since there is no abnormality in the ISS-ECU 68, the hydraulic pressure and the negative pressure $P_{brk}$ of the brake booster 40 are available.

Subsequently, in step S66, it is determined whether or not the abnormality detected in the above steps S30-S36 is an abnormality in the vehicle system. If it is determined in step S66 that the abnormality detected in the above steps S30-S36 is not an abnormality in the vehicle system, then the process proceeds to step S68, where it is determined whether or not the abnormality detected in the above steps S30-S36 is an abnormality in the starting function. If it is determined in step S68 that the abnormality detected in the above steps S30-S36 is an abnormality in the starting function, then a setting-change for restarting the engine 10 will be performed in step S70. In the setting-change for restarting the engine 10, in the present embodiment, the SL1 drive relay 70a and/or the SL2 drive relay 72a are substituted by the SL1 backup relay 70b and/or the SL2 backup relay 72b before the starter 56 is started. Step S70 is performed for, when it is determined on the basis of a diagnostic outcome of the abnormality diagnostic 68b that there exists an abnormality in at least one of the switching elements 74a, 74c, the SL1 drive relay 70a, and the SL2 drive relay 72a and the like, driving the starter 56 by using an electrical path that can bypass these drive relays.

On the other hand, if it is determined in step S66 that the abnormality detected in the above steps S30-S36 is an abnormality in the vehicle system, then the process proceeds to step S72, where it is determined whether or not there exists an abnormality in at least one of the spark plug 14, the fuel injection valve 12, and the throttle valve 20. Step S72 is performed for restricting (or prohibiting) the forcible restarting of the engine 10 when it is known in advance that the engine 10 cannot be restarted or the engine 10 cannot be controlled properly after the engine is restarted.

If it is determined in step S72 that there exists an abnormality in at least one of the spark plug 14, the fuel injection valve 12, and the throttle valve 20, then the process proceeds to step S74, where it is determined whether or not there exists an abnormality in the DC/DC converter 62. Step S74 is performed for determining whether or not the forcible restarting of the engine should be restricted. Such restriction is needed for the following reason.

In the presence of an abnormality in the DC/DC converter 62, a voltage of the battery may not be raised properly. When the starter 56 is driven to restart the engine 10 while the vehicle is running, the voltage of the battery 60 decreases, which may lead to the reset operation as set forth above. The brake assist operation may not be performed by the brake actuator 38 properly, and the power steering system 52 may not assist the user in steering the steering wheel properly. Therefore, it is determined whether or not the restarting of the engine should be restricted.

If it is determined in step S74 that there exists an abnormality in the DC/DC converter 62, then the process proceeds to step S76, where it is determined whether or not the logical OR of the following conditions (F)-(G) is TRUE: (F) the traveling speed of the vehicle V is equal to or smaller than a second prescribed speed V2 (e.g., 7 km/h) that is smaller than the first prescribed speed V1 and is larger than 0, and (G) the brake is not being actuated (the brake is OFF). Step S76 is performed for determining whether or not the restriction of forcible restarting of the engine can be canceled even in the presence of an abnormality in the DC/DC converter 62. This operation is based on the following assumption that, when it is known from the fact that the traveling speed of the vehicle V is low or the brake is not being actuated that the user intends to move the vehicle, the vehicle manipulation will be less affected by the reset operation.

At the time of transition to step S78, it is determined that the restarting of the engine doesn't have to be restricted. The forcible restarting of the engine is performed on the basis of a determination that the user is in vehicle resulting from the fact that the vehicle is not stationary (the vehicle is running).

Subsequently, in step S80, it is determined whether or not the engine 10 has been restarted. Whether or not the engine 10 has been restarted may be determined, for example, on the basis of whether or not the engine rotation speed derived from the output value of the crank angle sensor 18 is equal to or larger than a predetermined speed at which self-sustained operation of the engine 10 is enabled.

If it is determined in step S80 that the engine 10 has been restarted, then the process proceeds to step S82, where the brake assist operation is stopped. Step S82 takes into account the fact that the brake booster 40 becomes able to assist in the brake actuation since the engine 10 has been restarted.

On the other hand, it is determined in step S80 that the engine 10 has not been restarted, then it is assumed that the engine 10 has failed to be restarted. In next step S84, a notification will be produced for prompting the user to take appropriate evasive action such as evasive running with attention to the brake actuation. In the evasive running, for example, the user diverts the vehicle from a running lane onto a side strip after occurrence of the abnormality in vehicle-mounted devices. That is, when the engine 10 is stopped, the brake booster 40 may become unable to assist the user in actuating the brake pedal 42 properly. For example, when the user pumps the brake, the negative pressure of the brake booster 40 may not be ensured, which leads to a situation such that the braking force cannot be applied to the wheel properly. Therefore, the above notification may prompt the user to take suitable measures. In the notification, for example, a visual message, which is displayed on a display of the navigation system 54, or a voice message from a navigation system 54, instructs the user to drive the vehicle into a safer place such as a road shoulder, without pumping of the brake, visually or aurally.

If it is determined in step S72 that there is an abnormality in at least one of the spark plug 14, the fuel injection valve 12, and the throttle valve 20, or it is determined in step S76 that the logical OR of the conditions (F)-(G) is FALSE, or after step S82, or after step S84, the process is ended in the current cycle. Steps S60, S62, and subsequent steps S78-S84 are performed by the engine-ECU 64. The other steps are performed by the ISS-ECU 68.

Figure 6:
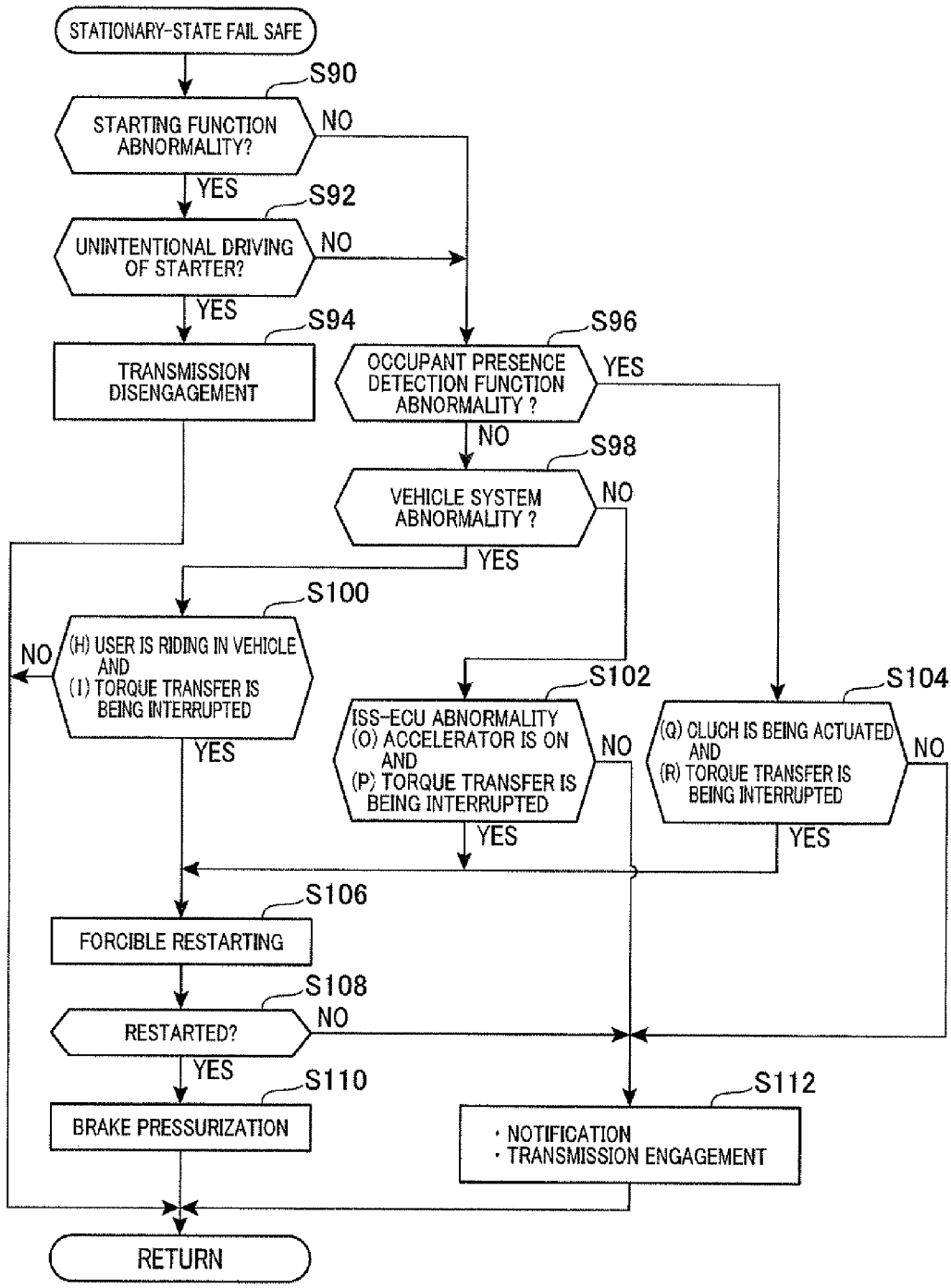
FIG. 6 schematically shows a flowchart of a stationary-state fail-safe operation.

FIG. 6 shows a flowchart of the stationary state fail-safe operation to be performed by the ISS-ECU 68 or the engine-ECU 64.

First, in step S90, it is determined whether or not the abnormality detected in the above steps S30-S36 is an abnormality in the starting function. If it is determined in step S90 that the abnormality detected in the above steps S30-S36 is an abnormality in the starting function, then the process proceeds to step S92, where it is determined whether or not the starter 56 has been driven unintentionally. Step S90 is performed for checking for occurrence of an abnormality such that something has triggered the starter 56 to be driven despite a lack of a starting request for starting the starter 56.

If it is determined in step S92 that the starter 56 has been driven unintentionally, then the process proceeds to step S94, where the transmission is disengaged. Step S94 is performed for actuating the gear-shifting actuator 24c by controlling power supply thereto to interrupt torque transfer between the crankshaft 16 and the drive wheel 32, thereby avoiding power running of the vehicle when the starter 56 is driven unintentionally.

If it is determined in step S90 that the abnormality detected in the above steps S30-S36 is not an abnormality in the starting function, or if it is determined in step S92 that the starter 56 has not been driven unintentionally, then it is determined in steps S96-S104 whether or not the user is riding in the vehicle. That is, if it is determined in step S90 that the abnormality detected in the above steps S30-S36 is not an abnormality in the starting function, then it is determined in steps S96, S98 whether the abnormality detected in the above steps S30-S36 is an abnormality in an occupant presence detection function or an abnormality in the vehicle system.

If it is determined in steps S96, S98 that the abnormality detected in the above steps S30-S36 is not an abnormality in the occupant presence detection function, but an abnormality in the vehicle system, then the process proceeds to step S100, where it is determined whether or not the logical AND of the following conditions (H)-(I) is TRUE: (H) the user is riding in the vehicle, and (I) the torque transfer between the crankshaft 16 and the drive wheel 32 is being interrupted. Step S100 is performed for confirming the user is riding in the vehicle, and then restarting the engine forcibly when there exists an abnormality in the starting function or an abnormality in the vehicle system. Whether or not the user is riding in the vehicle may be determined on the basis of the logical AND of the following conditions (J)-(L) is TRUE: (J) it is determined on the basis of an output value of the door switch 88 that the door is closed, (K) it is determined on the basis of an output value of the buckle switch 90 that the user is wearing a seatbelt, and (L) it is determined on the basis of an output value of the hood switch 92 that the hood is closed. If the logical AND is TRUE, it can be assumed that the user is riding in the vehicle.

The above condition (I) is a condition for avoiding an engine stall when the engine 10 is restarted and unintended moving of the vehicle. That is, when the torque of the engine 10 is being transferred from the crankshaft 16 to the drive wheel 32 when the engine 10 is restarted, there may occur the engine stall and the unintended moving of the vehicle due to driving force of the starter 56 being used for the power running. Therefore, the above condition (I) leads to prevention of the engine stall and the unintended moving of the vehicle from occurring. Whether or not the torque of the engine is being transferred may be determined on the basis of a condition that the logical OR of the following conditions (M)-(N) is TRUE: (M) the shifting position of the gear-shifting device is in neutral, and (N) the clutch is disengaged.

If it is determined in steps S98 that the abnormality detected in the above steps S30-S36 is not an abnormality in the vehicle system, then it is determined that the abnormality detected in the above steps S30-S36 is an abnormality in the ISS-ECU 68. In step S102, it is determined whether or not the logical AND of the following conditions (O)-(P) is TRUE: (O) the accelerator is being actuated by the user, and (P) the torque transfer between the crankshaft 16 and the drive wheel 32 is being interrupted. Step S102 is performed for confirming the user is riding in the vehicle when there exists an abnormality in the ISS-ECU 68, and then restarting the engine forcibly.

The condition (O) is a condition for determining whether or not the user intends to restart the engine 10. That is, since there exists an abnormality in the ISS-ECU 68, reliability of the outputs of the door switch 88, the buckle switch 90 and the hood switch 92 is decreased, which may make it difficult to accurately determine whether or not the user is riding in the vehicle on the basis of these outputs. When the accelerator is being actuated, it can be assumed that the user is riding in the vehicle, and intends to restart the engine 10. Therefore, the engine may be restarted. Whether or not the accelerator is being actuated may be determined, for example, on the basis of a determination of whether or not the accelerator actuation amount is larger than 0 on the basis of an output value of the accelerator-pedal sensor 80.

If it is determined in steps S96 that the abnormality detected in the above steps S30-S36 is an abnormality in the occupant presence detection function, then the process proceeds to step S104, where it is determined whether or not the logical AND of the following conditions (Q)-(R) is TRUE: (Q) the clutch is being actuated, and (R) the torque transfer between the crankshaft 16 and the drive wheel 32 is being interrupted. Step S104 is performed for, when there exists an abnormality in the occupant presence detection function, determining whether or not to cancel the restriction of restarting of the engine. The condition (Q) is a condition for confirming the user is riding in the vehicle. That is, when the clutch is being actuated even in the presence of an abnormality in the occupant presence detection function, the user is likely to be in the vehicle. Whether or not the clutch is being actuated may be determined on the basis of determination of whether or not a clutch actuation amount is larger than 0%. The condition (R) is a condition for avoiding the engine stall and the like.

If it is determined in step S100 that the logical AND of the conditions (H)-(I) is TRUE, or if it is determined in step S102 that the logical AND of the conditions (O)-(P) is TRUE, or it is determined in step S104 that the logical AND of the conditions (Q)-(R) is TRUE, then the process proceeds to step S106, where the engine is restarted forcibly. In next step S108, it is determined whether or not the engine 10 has been restarted. If it is determined that the engine 10 has been restarted, then the process proceeds to step S110, where the brake pressurization is stopped. When the brake assist operation is being performed, the brake assist operation is also stopped.

If it is determined in step S102 that the logical AND of the conditions (O)-(P) is FALSE, or if it is determined in step S104 that the logical AND of the conditions (Q)-(R) is FALSE, or if it is determined in step S108 that the restarting of the engine 10 has failed, then the process proceeds to step S112, where a notification is produced for prompting the user to restart the engine 10 by turning of the ignition key 58 and the transmission is engaged. The notification is produced if it is determined that the restarting of the engine 10 has failed, which may alleviate discomfort to the user when the engine continues to be stopped after the engine 10 has failed to be restarted forcibly. In addition, the notification is produced if it is determined in step S102 that the logical AND of the conditions (O)-(P) is FALSE, or it is determined in step S104 that the logical AND of the conditions (Q)-(R) is FALSE, which allows the user to take suitable measures when the user doesn't intend to restart the engine 10 or when the driving force of the starter 56 may be used for power running of the vehicle.

In the transmission engagement, the gear-shifting actuator 24c is actuated by controlling power supply thereto so that the torque of the engine is being transferred between the crankshaft 16 and the drive wheel 32. The transmission engagement is implemented for preventing unintended moving backward or forward of the vehicle even when the engine 10 fails to be restarted while the vehicle is stopped on an incline. More specifically, a gear-shifting actuator 24c is actuated by controlling power supply thereto so that the transmission gear ratio of the MT 24 is in a forward range (First) when the vehicle is stopped on an ascending slope, and the transmission gear ratio of the MT 24 is in a reverse range (Reverse) when the vehicle is stopped on an descending slope.

In the above configuration, the notification is implemented if it is determined in step S102 that the logical AND of the conditions (O)-(P) is FALSE, or if it is determined in step S104 that the logical AND of the conditions (Q)-(R) is FALSE, or if it is determined in step S108 that the engine has failed to be restarted forcibly. Alternatively, the notification may be implemented when it is determined by the engine-ECU 64 that there exists an abnormality in the ISS-ECU 68, or when it is determined by the ISS-ECU 68 that there exists an abnormality in the starting function, which allows the user to be prompted more early to restart the engine by turning the ignition key 58. In addition, after the notification, the brake pressurization and the brake assist operation may be stopped when it is determined that the engine 10 has been restarted by turning the ignition key 58, where the time of determination that there exists an abnormality in the ISS-ECU 68 may be identified with the time of determination that the engine has failed to be restarted.

If it is determined in step S100 that the logical AND of the conditions (H)-(I) is FALSE, or after step S94, or after step S110, or after step S112, then the process is ended in the current cycle.

The brake pressurization will be continued until it is determined that the engine 10 has been restarted in the stationary state fail-safe operation. This allows a protection function for preventing moving downward/forward during an uphill/downhill start of the vehicle (a hill hold function) to be maintained.

After it has been determined in the running-state fail-safe operation or the stationary state fail-safe operation that the engine 10 has been restarted, it is desirable to disable the automatic stopping of the engine 10, for example, until the vehicle is repaired in a repair facility.

There will now be explained some advantages in the present embodiment.

(1) When it is determined that during automatic stoppage of the engine 10 there exists an abnormality (or there has occurred an abnormality) in at least one of the ISS-ECU 68, the occupant presence detection function, the vehicle system, and the starting function and the vehicle is running, the engine 10 is restarted forcibly. This allows the driving force of the vehicle to be ensured and thus allows the user to take suitable measures, such as evasive running, in the presence of the abnormality.

(2) When during automatic stoppage of the engine 10 with the vehicle being running it is determined that there exists an abnormality (or there has occurred an abnormality) in the DC/DC converter 62, the forcible restarting of the engine 10 is restricted, which may prevent the brake assist operation or the like from being performed properly due to the reset operation.

In addition, when it is determined that the traveling speed of the vehicle V is smaller than the second prescribed speed V2 or the brake is not being actuated, the restriction of forcible restarting of the engine is canceled, which allows the driving force of the vehicle to be ensured as early as possible.

(3) When during automatic stoppage of the engine 10 it is determined that there exists an abnormality in the ISS-ECU 68 and the vehicle is running, the subsequent operations are performed by the engine-ECU 64 in place of the ISS-ECU 68. This allows the starter 56 to be restarted even in the presence of the ISS-ECU 68, thereby allowing the engine 10 to be restarted.

(4) When it is determined that there exists an abnormality in the SL1 drive relay 70*a* and/or the SL2 drive relay 72*a* in the drive circuit of the starter 56, the engine is restarted forcibly by means of the SL1 backup relay 70*b* and/or the SL2 backup relay 72*b*. This allows the starter 56 to be restarted even in the presence of an abnormality in the drive circuit and the like, thereby allowing the engine 10 to be restarted.

(5) When during automatic stoppage of the engine 10 it is determined that there exists an abnormality in at least one of the vehicle system and the starting function and the vehicle is stationary, and the user is riding in the vehicle, which is determined on the basis of the output value the buckle switch 90, the engine is restarted forcibly. This allows the user to take suitable measures subsequently.

(6) When during automatic stoppage of the engine 10 it is determined that the starter 56 has been driven unintentionally and the vehicle is stationary, the gear-shifting actuator 24*c* is actuated by controlling power supply thereto so that the torque transfer between the crankshaft 16 and the drive wheel 32 is interrupted. This may prevent the driving force of the starter 56 properly from being used for power running of the vehicle.

(7) When during automatic stoppage of the engine 10 it is determined that there exists an abnormality in the ISS-ECU 68 and the vehicle is stationary, the forcible restarting of the engine is restricted. This allows the user to take suitable measures subsequently.

In the above, when it is determined that the accelerator is being actuated, the restriction of forcible restarting of the engine is canceled. This allows the driving force of the vehicle to be ensured as early as possible.

(8) When it is determined that the forcible restarting of the engine 10 has failed and the vehicle is running, a notification is provided to the user for prompting the user to heed actuation of a brake-actuating element. This allows the user to take suitable measures, such as evasive running.

(9) When it is determined that the forcible restarting of the engine 10 has failed and the vehicle is stationary, a notification is provided to the user for prompting the user to start the engine 10 by turning the ignition key 58. This allows the user to start the engine 10 properly without giving the user discomfort.

(10) When during automatic stoppage of the engine 10 it is determined that there exists an abnormality in the occupant presence detection function and the vehicle is stationary, the restriction of forcible restarting of the engine 10 is canceled, provided that it is determined that at least one of the clutch device 22 and the MT 24 is interrupting the torque transfer between the crankshaft 16 and the drive wheel 32. This leads to prevention of the engine stall and unintended moving of the vehicle from occurring owing to that the driving force of the engine 10 is used for power running when the engine 10 is restarted.

(11) The brake pressurization is performed for applying braking force forcibly to the wheel during automatic stoppage of the engine 10 with the vehicle being stationary, and is continued until it is determined that the engine 10 has been restarted. This can prevent unintended moving backward or forward of the vehicle when the vehicle is located on an incline.

Subsequently, when it is determined that the engine 10 has been restarted, the brake pressurization is stopped. This allows the brake pressurization to be stopped at a suitable timing.

(12) When it is determined that the forcible restarting of the engine 10 has failed and the vehicle is stationary, the gear-shifting actuator 24*c* is actuated by controlling power supply thereto so that the torque of the engine can be transferred between the crankshaft 16 and the drive wheel 32. This can prevent unintended moving backward or forward of the vehicle when the vehicle is stopped on an incline, even when the engine 10 has filed to be restarted.

(13) When during automatic stoppage of the engine 10 it is determined that the vehicle is running, the braking device 36 is assisted in applying the braking force corresponding to a brake actuation amount, thereby achieving user's desired brake actuation as much as possible.

(14) It is determined whether or not a detection value of the wheel speed sensor 34 is of high reliability. Whether or not the vehicle is running is determined by using a detection value determined to be of high reliability. This allows the fail-safe operation to be performed properly according to whether or not the vehicle is running.

(Other Embodiments)

In the above embodiment, whether or not the detection value of each wheel speed sensor 34 is of high reliability is determined as follows. The detection value of each wheel speed sensor 34 may be considered of high reliability when it is determined that there is not any excessive difference between the detection values of wheel speed sensors 34 of the respective wheels 32 while the vehicle is traveling in a straight line.

Alternatively, whether or not the detection value of each wheel speed sensor 34 is of high reliability may be determined as follows. For example, when it is determined that the detection value of one of the wheel speed sensors 34 continues to be at its upper or lower limit for a predetermined time period, the detection value of the wheel speed sensor 34 may be considered of low reliability. This is because, when the detection value of the wheel speed sensor 34 continues to be at its upper or lower limit, it can be assumed that there exists an abnormality in the wheel speed sensor 34 or an abnormality such as disconnection in an electrical path between the wheel speed sensor 34 and the engine-ECU 64.

In the above embodiment, the transmission is a manual transmission (MT). Alternatively, the transmission may be an automatic transmission, where the condition that the clutch is disengaged is deleted from each of the stopping and restarting conditions of the engine 10 in steps S12, S20 shown in FIG. 3, and the condition that the torque transfer between the crankshaft 16 and the drive wheel 32 is being interrupted is deleted from each of the conditions in the subsequent steps S100, S102, S104 shown in FIG. 6.

Regarding the brake assist operation in the presence of an abnormality in the ISS-ECU 68, alternatively to the above embodiment, for example, when an output value of the hydraulic pressure sensor 46 is inputted to the engine-ECU 64, feedback control may be performed on the basis of the output value of the hydraulic pressure sensor 46. In addition, when an output value of the vacuum sensor 48 is also inputted to the engine-ECU 64, the brake assist operation may be performed taking account of a negative pressure of the brake booster 40.

In the above embodiment, whether or not the user intends to restart the engine 10 is determined on the basis of whether or not the brake is not being actuated (in step 76 shown in FIG. 5). Alternatively, for example, when it is determined that the accelerator has been actuated or that the shifting position has been changed from the non-driving state to the driving state, it may be determined that the user intends to restart the engine.

Regarding the determination of whether or not the user is riding in the vehicle, alternatively to the above embodiment, for example, when it is determined that the user is wearing a seatbelt on the basis of an output value of the buckle switch 90, it may be determined that the user is riding in the vehicle.

In the above embodiment, notification is performed by the navigation system 54. Alternatively, notification may be performed, for example, by means of an indicator light, where separate notification modes may be implemented by lighting and blinking of the indicator light or altering a time interval of blinking of the light.

In the above embodiment, in the presence of an abnormality in the ISS-ECU 68, the ISS-ECU 68 is substituted with the engine-ECU 64. Alternatively, in the presence of an abnormality in the ISS-ECU 68, the ISS-ECU 68 may be substituted with an ECU other than the engine-ECU 64.

In the above embodiment, each of the SL1 drive relay 70a and the SL2 drive relay 72a is connected in parallel with only one backup relay. Alternatively, each of the SL1 drive relay 70a and the SL2 drive relay 72a may be connected in parallel with two or more backup relays.

In the above embodiment, the braking force is applied forcibly by the brake pressurization until it is determined that the engine 10 has been restarted. Alternatively, for example, the braking force may continue to be applied forcibly until the accelerator is actuated after determination that the engine 10 has been restarted.

In the above embodiment, in cases where there exists an abnormality in the occupant presence detection function, whether or not the user is riding in the vehicle is determined on the basis of the clutch actuation. Alternatively, for example, in step S104 shown in FIG. 6, whether or not the user is riding in the vehicle may be determined on the basis of a condition that the clutch is disengaged. The condition regarding only the clutch actuation allows both whether or not the user is riding in the vehicle and whether or not the power transfer is being interrupted to be determined.

Regarding the determination of whether or not the vehicle is stationary, alternatively to the above embodiment, for example, it may be determined that the vehicle is stationary when it is determined that the traveling speed of the vehicle V is smaller than a threshold speed (e.g., extremely-low traveling speed of 3 km/h). On the other hand, it may be determined that the vehicle is running when it is determined that the traveling speed of the vehicle V is equal to or larger than the threshold speed. In such an alternative embodiment, when the extremely-low traveling speed is reached, the braking force is applied forcibly to the wheel by the brake pressurization, which would give the user little discomfort.

In the above embodiment, there is used in the running-state or stationary-state fail-safe operation the control logic such that both the forcible restarting of the engine and the assisting of the braking device 36 in applying the braking force are performed. Alternatively, for example, the control logic may be used such that either one of the forcible restarting of the engine and the assisting of the braking device 36 in applying the braking force is performed. For example, even in the case of control logic where only the restarting of the engine is performed, the transmission engagement when it is determined that the restarting of the engine 10 has failed could avoid unintended moving backward or forward of the vehicle.

In the above embodiment, as shown in FIG. 1, only the engine-ECU 64 and the ISS-ECU 68 are vehicle-mounted devices that are supplied with electrical power from the battery 60 via the DC/DC converter 62. Alternatively, for example, the vehicle-mounted devices that are supplied with electrical power from the DC/DC converter 62 may include a vehicle-mounted device involved in drive control of the vehicle (e.g., a brake ECU), a vehicle-mounted device that assists in traveling of the vehicle (e.g., an ECU implemented in a power steering system 52, a direction indicator, or a navigation system 54 that communicates information with the external). Even in such alternative embodiments, since movement of the vehicle may not be controlled properly under a situation where the DC/DC converter 62 cannot prevent influence of decrease in voltage of the battery when supplying electrical power to these vehicle-mounted devices, it would be effective to restrict the forcible starting of the engine.

In the above embodiment, the restarting condition of the engine 10 is that the logical OR of the two conditions (D)-(E) is TRUE: (D) the brake is not being actuated (the brake is OFF) and (E) the clutch is disengaged. Alternatively, for example, (D) may be a condition that the accelerator is being actuated.

In the above embodiment, the engine 10 is a spark-ignition engine. Alternatively, for example, the engine may be a compression ignition engine such as a diesel engine.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A control apparatus for a vehicle, the vehicle comprising control means for stopping an engine automatically when a stopping condition is met, which includes a condition that a traveling speed of the vehicle is equal to or smaller than a first prescribed speed larger than zero, and restarting the engine after the automatic stoppage of the engine, when a predetermined restarting condition is met, a braking device that is actuated to apply braking force to a drive wheel, and a plurality of vehicle-mounted devices involved in operations of the vehicle, the apparatus comprising:
abnormality detection means for determining whether or not there exists an abnormality in at least one of the vehicle-mounted devices; and
fail-safe means for, when during automatic stoppage of the engine it is determined by the abnormality detection means that there exists an abnormality in at least one of the vehicle-mounted devices, restarting the engine forcibly and/or assisting the braking device in applying the braking force to the wheel.

2. The apparatus of claim 1, wherein the fail-safe means restarts the engine forcibly when during automatic stoppage of the engine it is determined by the abnormality detection means that there exists an abnormality in at least one of the vehicle-mounted devices and a user is riding in the vehicle.

3. The apparatus of claim 2, wherein the vehicle further comprises traveling speed detection means for detecting a traveling speed of the vehicle, and
the apparatus further comprising running state detection means for determining that the vehicle is running when the traveling speed of the vehicle detected by the traveling speed detection means is equal to or larger than a threshold value larger than zero, wherein
the fail-safe means determines that the user of the vehicle is riding in the vehicle when it is determined by the running state detection means that the vehicle is running.

4. The apparatus of claim 3, wherein the plurality of vehicle-mounted devices include occupant presence detection means for determining whether or not the user is riding in the vehicle,
the fail-safe means restarts the engine forcibly when it is determined by the abnormality detection means that there exists an abnormality in the occupant presence detection means and it is determined by the running state detection means that the vehicle is running.

5. The apparatus of claim 3, wherein the plurality of vehicle-mounted devices include a starter that is powered by a vehicle-mounted battery and applies an initial torque to an output shaft of the engine, and a converter that boosts and outputs a voltage of the battery,
the apparatus is driven by the output power of the converter and is reset when the output voltage of the converter is equal to or smaller than the a specified voltage, and
the fail-safe means includes restriction means for restricting the forcible restarting of the engine when it is determined by the abnormality detection means that there exists an abnormality in the converter.

6. The apparatus of claim 5, wherein the restriction means cancels the restriction of forcible restarting of the engine when it is determined that the traveling speed of the vehicle is smaller than a second prescribed speed smaller than the first prescribed speed.

7. The apparatus of claim 5, wherein the vehicle further comprises a actuation element that is actuated by the user to accelerate and/or decelerate the vehicle,
the apparatus further comprises restart intention detection means for determining whether or not the user intends to restart the engine on the basis of an actuation state of the actuation element,
the restriction means cancels the restriction of forcible restarting of the engine, provided that it is determined by the restart intention detection means that the user intends to restart the vehicle.

8. The apparatus of claim 1, wherein the fail-safe means is implemented in each of a plurality of control units including a main control unit and a substitution control unit with respect to the forcible restarting of the engine, the plurality of control units being communicable with each other and being included in the plurality of vehicle-mounted devices, and
the substitution control unit restarts the engine forcibly in place of the main control unit when it is determined by the abnormality detection means that there exists an abnormality in the main control unit.

9. The apparatus of claim 1, wherein the plurality of vehicle-mounted devices include a starter that applies an initial torque to an output shaft of the engine,
the fail-safe means is implemented in each of a plurality of control units including a main control unit and a substitution control unit with respect to the forcible restarting of the engine, the plurality of control units being communicable with each other and being included in the plurality of vehicle-mounted devices,
the starter can be driven by each of the main and substitution control units via their respective electrical paths, and is driven normally by the main control unit via its corresponding electrical path,
the substitution control unit restarts the engine forcibly by driving the starter in place of the main control unit via the electrical path associated with the substitution control unit when it is determined by the abnormality detection means that there exists an abnormality in the electrical path associated with the main control unit.

10. The apparatus of claim 1, wherein the plurality of vehicle-mounted devices include a starter that applies an initial torque to an output shaft of the engine,
the starter can be driven by the control apparatus via one of a plurality of electrical paths,
the fail-safe means restarts the engine forcibly by driving the starter via one of the other electrical paths when it is determined by the abnormality detection means that there exists an abnormality in the one of the plurality of electrical paths.

11. The apparatus of claim 2, wherein
the vehicle further comprises traveling speed detection means for detecting a traveling speed of the vehicle,
the plurality of vehicle-mounted devices include occupant presence detection means for determining whether or not the vehicle user is riding in the vehicle,
the apparatus further comprising stationary state detection means for determining that the vehicle is stationary when the traveling speed of the vehicle detected by the traveling speed detection means is smaller than a threshold value larger than zero, wherein
the fail-safe means restarts the engine forcibly, provided that it is determined by the occupant presence detection means that the user is riding in the vehicle, when it is determined by the abnormality detection means that there exists an abnormality in at least one of the plurality of vehicle-mounted devices other than the occupant presence detection means and it is determined by the stationary state detection means that the vehicle is stationary.

12. The apparatus of claim 11, wherein the plurality of vehicle-mounted devices include a starter that applies an initial torque to an output shaft of the engine,
the fail-safe means is implemented in each of a plurality of control units including a main control unit and a substitution control unit with respect to the forcible restarting of the engine, the plurality of control units being communicable with each other and being included in the plurality of vehicle-mounted devices,
the starter can be driven by each of the main and substitution control units, and is driven normally by the main control unit,
the substitution control unit restarts the engine forcibly by driving the starter in place of the main control unit when it is determined by the abnormality detection means that there exists an abnormality in the main control unit and it is determined by the stationary state detection means that the vehicle is stationary.

13. The apparatus of claim 11, wherein
the fail-safe means is implemented in each of a plurality of control units including a main control unit and a substitution control unit with respect to the forcible restarting of the engine, the plurality of control units being communicable with each other and being included in the plurality of vehicle-mounted devices,
the substitution control unit includes restriction means for restricting the forcible restarting of the engine when it is determined by the abnormality detection means that there exists an abnormality in the main control unit and it is determined by the stationary state detection means that the vehicle is stationary.

14. The apparatus of claim 13, wherein the vehicle further comprises an actuation element that is actuated by the user to accelerate and/or decelerate the vehicle,
the apparatus further comprises restart intention detection means for determining whether or not the user intends to restart the engine on the basis of a actuation state of the actuation element,
the restriction means cancels the restriction of forcible restarting of the engine, provided that it is determined by the restart intention detection means that the user intends to restart the vehicle.

15. The apparatus of claim 11, wherein the vehicle further comprises a transmission that transfers a torque of the engine to a drive wheel,
the plurality of vehicle-mounted devices include a starter that applies an initial torque to an output shaft of the engine, and
the fail-safe means actuates the transmission so that the torque transfer between the output shaft and the drive wheel is interrupted, when it is determined by the abnormality detection means that there exists an abnormality in the starter such that the starter has been driven unintentionally and it is determined by the stationary state detection means that the vehicle is stationary.

16. The apparatus of claim 2, wherein the vehicle further comprises traveling speed detection means for detecting a traveling speed of the vehicle, and a brake booster that assists the user in actuating a brake-actuating element by means of a negative pressure downstream of an intake-air throttle valve disposed in an intake manifold of the engine, and the apparatus further comprising:
running state detection means for determining that the vehicle is running when the traveling speed of the vehicle detected by the traveling speed detection means is equal to or larger than a threshold value larger than zero; and
notification means for providing a notification to the user for prompting the user to pay attention to actuation of a brake-actuating element when it is determined that the forcible restarting of the engine has failed and it is determined by the running state detection means that the vehicle is running.

17. The apparatus of claim 2, wherein the vehicle further comprises traveling speed detection means for detecting a traveling speed of the vehicle, and the apparatus further comprising:
stationary state detection means for determining that the vehicle is stationary when the traveling speed of the vehicle detected by the traveling speed detection means is smaller than a threshold value larger than zero; and
notification means for providing a notification to the user for prompting the user to start the engine by turning an ignition key when it is determined that the forcible restarting of the engine has failed and it is determined by the stationary state detection means that the vehicle is stationary.

18. The apparatus of claim 17, wherein the time when it is determined that the forcible restarting of the engine has failed is set to be equal to the time when it is determined by the abnormality detection means that there exists an abnormality in at least one of the vehicle-mounted devices.

19. The apparatus of claim 2, wherein the vehicle further comprises traveling speed detection means for detecting a traveling speed of the vehicle, and a clutch and a manual transmission that are actuated by the user to transfer a torque of an output shaft of the engine to a drive wheel,
the plurality of vehicle-mounted devices include occupant presence detection means for determining whether or not the user is riding in the vehicle, and the apparatus further comprising:
stationary state detection means for determining that the vehicle is stationary when the traveling speed of the vehicle detected by the traveling speed detection means is smaller than a threshold value larger than zero; and
the fail-safe means restarts the engine forcibly, provided that it is determined that the clutch is being actuated, when it is determined by the abnormality detection means that there exists an abnormality in the occupant presence detection means and it is determined by the stationary state detection means that the vehicle is stationary.

20. The apparatus of claim 2, wherein the vehicle further comprises a clutch and a manual transmission that are actuated by the user to transfer a torque of an output shaft of the engine to a drive wheel, the fail-safe means restarts the engine forcibly when it is determined that the torque transfer between the output shaft of the engine and the drive wheel is being interrupted by at least one of the clutch and the manual transmission.

21. The apparatus of claim 2, wherein the vehicle further comprises traveling speed detection means for detecting a traveling speed of the vehicle, and a transmission that transfers a torque of an output shaft of the engine to a drive wheel, the apparatus further comprises stationary state detection means for determining that the vehicle is stationary when the traveling speed of the vehicle detected by the traveling speed detection means is smaller than a threshold value larger than zero, wherein the fail-safe means actuates the transmission so that the torque of the output shaft of the engine can be transferred to the drive wheel, when it is determined that the forcible restarting of the engine has failed and it is determined by the stationary state detection means that the vehicle is stationary.

22. The apparatus of claim 1, wherein the vehicle further comprises traveling speed detection means for detecting a traveling speed of the vehicle, and the braking device applies braking force to the wheel by the user actuating a brake-actuating element or actuating a motorized actuator by controlling power supply thereto, the apparatus further comprises:

stationary state detection means for determining that the vehicle is stationary when the traveling speed of the vehicle detected by the traveling speed detection means is smaller than a threshold value larger than zero; and forcible braking-force application means actuates the motorized actuator by controlling power supply thereto to apply the braking force forcibly to the wheel during automatic stoppage of the engine, wherein the fail-safe means continues the application of the braking force to the wheel by the forcible braking-force application means until it is determined that the engine has been restarted forcibly, when it is determined by the abnormality detection means that there exists an abnormality in at least one of the plurality of vehicle-mounted devices and it is determined by the stationary state detection means that the vehicle is stationary.

23. The apparatus of claim 22, wherein the fail-safe means stops the forcible application of the braking force to the wheel by the forcible braking-force application means when it is determined that the engine has been restarted.

24. The apparatus of claim 1, wherein the vehicle further comprises traveling speed detection means for detecting a traveling speed of the vehicle, the braking device includes a brake booster that assists the user in actuating a brake-actuating element by means of a negative pressure downstream of an intake-air throttle valve disposed in an intake manifold of the engine, and the apparatus further comprises:

running state detection means for determining that the vehicle is running when the traveling speed of the vehicle detected by the traveling speed detection means is equal to or larger than a threshold value larger than zero, wherein the fail-safe means actuates the brake booster by controlling power supply thereto so as to assist in applying the braking force forcibly to the wheel according to actuation of the brake-actuating element, when during automatic stoppage of the engine it is determined by the abnormality detection means that there exists an abnormality in at least one of the vehicle-mounted devices and it is determined by the running state detection means that the vehicle is running.

25. The apparatus of claim 1, wherein the vehicle-mounted devices include at least one of an actuator for combustion control of the engine including a fuel injection valve that supplies fuel to a combustion chamber of the engine, a brake booster that assists the user in actuating a brake-actuating element by means of a negative pressure downstream of an intake-air throttle valve disposed in an intake manifold of the engine, and an engine-driven air-conditioner that demists a windscreen of the vehicle.

26. The apparatus of claim 1, wherein the vehicle further comprises traveling speed detection means for detecting a traveling speed of the vehicle, the apparatus further comprises reliability determination means for determining whether or not a detection value of the traveling speed detection means is of high reliability, wherein the fail-safe means determines, on the basis of the detection value of the traveling speed detection means determined to be of high reliability, whether or not the vehicle is running.

27. The apparatus of claim 2, wherein the vehicle further comprises traveling speed detection means for detecting a traveling speed of the vehicle, and an automatic transmission that transfers a torque of an output shaft of the engine to a drive wheel, the plurality of vehicle-mounted devices include occupant presence detection means for determining whether or not the user is riding in the vehicle, and the apparatus further comprising:

stationary state detection means for determining that the vehicle is stationary when the traveling speed of the vehicle detected by the traveling speed detection means is smaller than a threshold value larger than zero; and the fail-safe means doesn't restart the engine forcibly, when it is determined by the abnormality detection means that there exists an abnormality in the occupant presence detection means and it is determined by the stationary state detection means that the vehicle is stationary.

* * * * *